US011067233B2

(12) United States Patent
Boulanger et al.

(10) Patent No.: US 11,067,233 B2
(45) Date of Patent: Jul. 20, 2021

(54) LIGHTING ARRANGEMENT WITH BATTERY BACKUP

(71) Applicant: CP IP Holdings Limited, Hong Kong (CN)

(72) Inventors: Dave Boulanger, Hong Kong (CN); Maciej Nowakowski, West Vancouver (CA)

(*) Notice: Subject to any disclaimer, the term of this patent is extended or adjusted under 35 U.S.C. 154(b) by 0 days.

(21) Appl. No.: 16/900,164

(22) Filed: Jun. 12, 2020

(65) Prior Publication Data

US 2020/0393098 A1 Dec. 17, 2020

Related U.S. Application Data

(60) Provisional application No. 62/861,589, filed on Jun. 14, 2019.

(51) Int. Cl.
*F21S 8/02* (2006.01)
*F21S 9/02* (2006.01)
(Continued)

(52) U.S. Cl.
CPC ............... *F21S 8/028* (2013.01); *F21S 8/026* (2013.01); *F21S 9/02* (2013.01); *F21S 8/03* (2013.01);
(Continued)

(58) Field of Classification Search
CPC ........ F21V 21/03; F21V 21/04; F21V 21/041; F21V 21/042; F21V 21/043; F21V 21/044; F21V 21/045; F21V 21/046; F21V 21/047; F21V 21/048; F21V 21/049; F21S 8/02; F21S 8/026; F21S 8/028; F21S 8/03; F21S 8/031; F21S 8/04; F21S 8/043
See application file for complete search history.

(56) References Cited

U.S. PATENT DOCUMENTS 4,098,423 A 7/1978 Marrero
4,250,540 A 2/1981 Kristofek
(Continued)

FOREIGN PATENT DOCUMENTS

FR 2902844 A1 * 12/2007 .............. F21V 21/03
KR 101521945 B1 5/2015

OTHER PUBLICATIONS

Machine translation of KR20140060070A retrieved from KIPO. (Year: 2021).*

*Primary Examiner* — Alexander K Garlen
*Assistant Examiner* — Colin J Cattanach
(74) *Attorney, Agent, or Firm* — Black, McCuskey, Souers & Arbaugh LPA

(57) ABSTRACT

A lighting arrangement operable to emit light is disclosed herein. The lighting arrangement can include a mounting bracket and a luminaire. The mounting bracket can have first and second bracket portions positioned about a central longitudinal axis of the mounting bracket. The mounting bracket can also include at least one pair of telescoping shafts interconnecting the first and second bracket portions. The mounting bracket can also include at least one spring positioned to bias the at least one pair of telescoping shafts to an extended configuration. The luminaire can have at least one spring member selectively engageable with at least one shaft of the at least one pair of telescoping shafts to selectively interconnect the luminaire and the mounting bracket.

20 Claims, 13 Drawing Sheets

(51) Int. Cl.
*F21V 21/04* (2006.01)
*F21S 8/04* (2006.01)
*F21S 8/00* (2006.01)
*F21V 21/03* (2006.01)

(52) U.S. Cl.
CPC .............. *F21S 8/031* (2013.01); *F21S 8/04* (2013.01); *F21S 8/043* (2013.01); *F21V 21/03* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01)

(56) References Cited

U.S. PATENT DOCUMENTS

| | | | |
|---|---|---|---|
| 5,377,088 A | 12/1994 | Lecluze | |
| 5,609,414 A | 3/1997 | Caluori | |
| 6,505,960 B2 | 1/2003 | Schubert | |
| 6,554,458 B1 | 4/2003 | Benghazi | |
| 7,135,640 B1 | 11/2006 | Ofcharsky | |
| 7,191,993 B2 | 3/2007 | Bobrowski | |
| 7,673,842 B2 | 3/2010 | Nevers | |
| 8,066,412 B2 | 11/2011 | Vann | |
| 8,465,182 B1 | 6/2013 | Davis | |
| 8,899,374 B2 | 12/2014 | Tanaka | |
| 9,115,877 B1 | 8/2015 | Berry | |
| 10,240,761 B2 | 3/2019 | Elmvang | |
| 10,330,291 B2 | 6/2019 | Nguyen | |
| 10,508,445 B2 | 12/2019 | Voellmeeke, III | |
| 10,566,777 B2 | 2/2020 | Larsson | |
| 2003/0223240 A1 | 12/2003 | Houle | |
| 2005/0258326 A1 | 11/2005 | St. Pierre | |
| 2009/0284958 A1 | 11/2009 | Pickard | |
| 2011/0176295 A1* | 7/2011 | Chang | F21V 21/04 362/147 |
| 2014/0198481 A1* | 7/2014 | Kim | F21V 23/023 362/95 |
| 2018/0111547 A1* | 4/2018 | Gall | F21V 21/0885 |
| 2018/0142871 A1* | 5/2018 | Morales | F21V 21/14 |
| 2018/0163930 A1* | 6/2018 | Schwartz | F21V 21/14 |
| 2018/0216805 A1* | 8/2018 | Gantenbrink | F21V 17/02 |
| 2019/0338925 A1* | 11/2019 | Green | F21V 17/002 |
| 2019/0376671 A1* | 12/2019 | Cheng | B65G 9/00 |
| 2020/0041106 A1* | 2/2020 | Ninomiya | F21V 15/012 |
| 2020/0256546 A1* | 8/2020 | Zhou | F21V 23/06 |

* cited by examiner

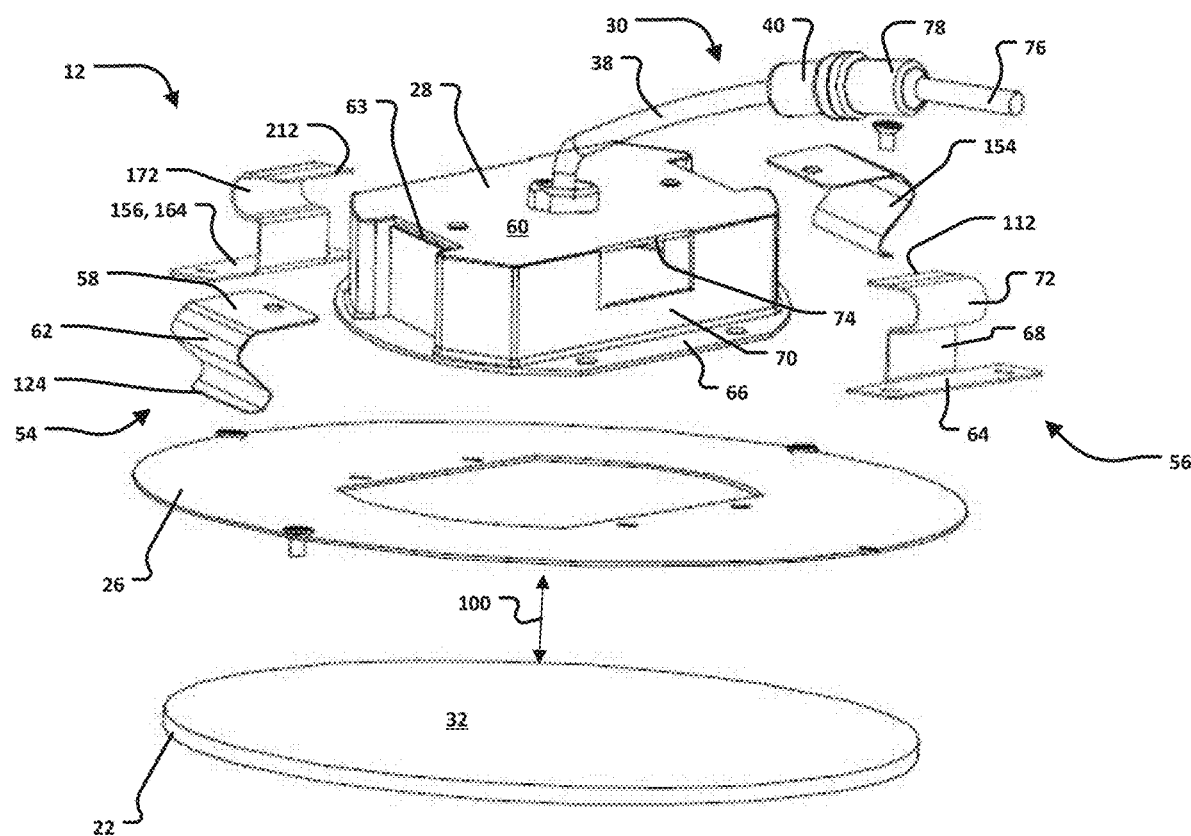
FIGURE 4
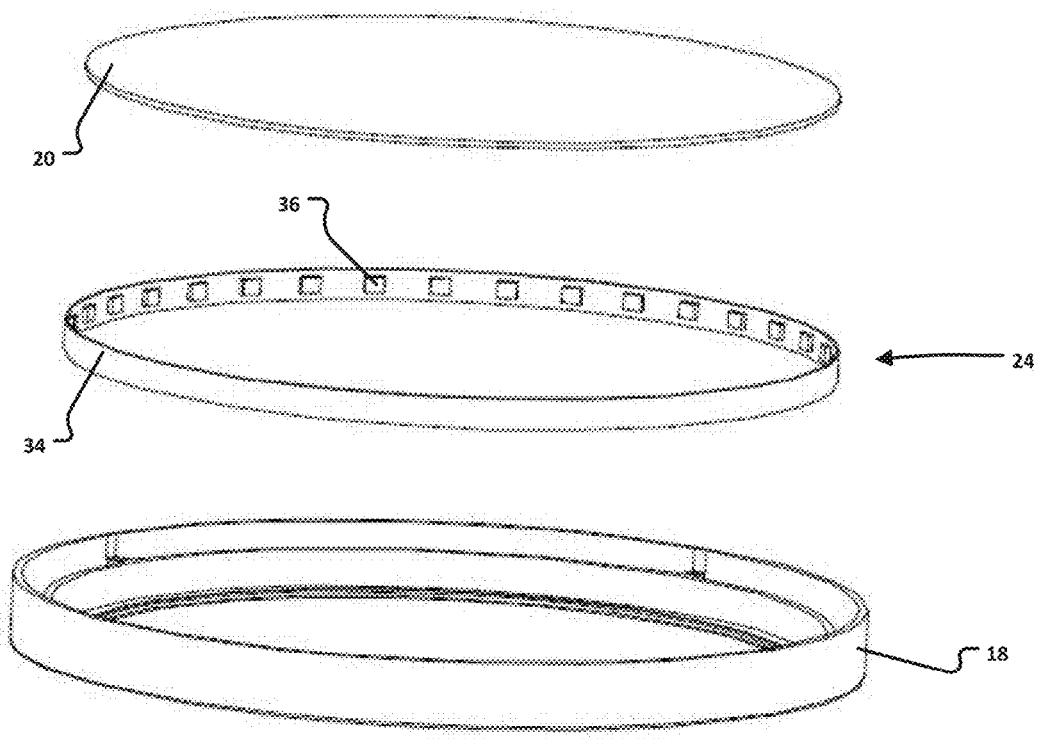

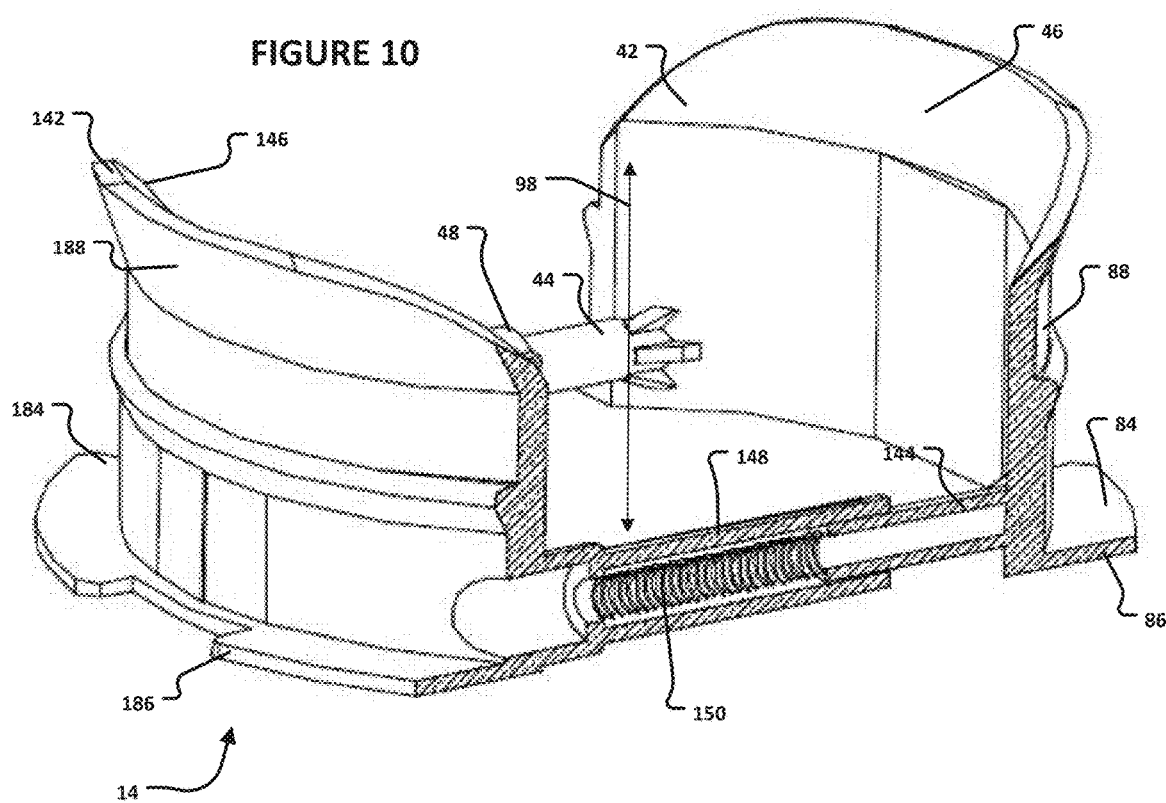
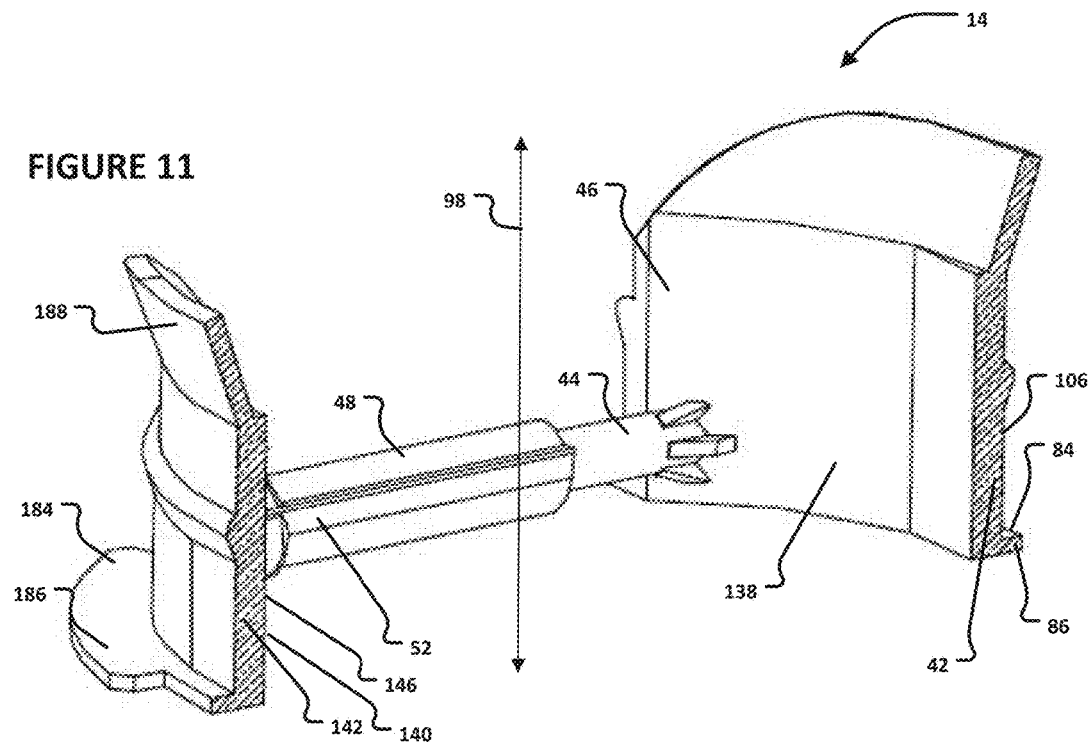

LIGHTING ARRANGEMENT WITH BATTERY BACKUP

CROSS-REFERENCE TO RELATED APPLICATIONS

This application claims the benefit of U.S. Provisional Patent Application Ser. No. 62/861,589 for a LIGHTING ARRANGEMENT, filed on Jun. 14, 2019, which is hereby incorporated by reference in its entirety.

BACKGROUND

1. Field

The present disclosure relates to lighting devices or fixtures operable to emit light.

2. Description of Related Prior Art

KR101521945B1 discloses an ADAPTOR FOR CEILING LIGHT HAVING STOPPER. The adaptor includes stop means facilitating the operation of separating a lamp from the adapter. The stop means includes an operation button lateral claw which is extended in a direction toward an operation button from a first location.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighting arrangement can include a mounting bracket and a luminaire. The mounting bracket can have first and second bracket portions positioned about a central longitudinal axis of the mounting bracket. The mounting bracket can also include at least one pair of telescoping shafts interconnecting the first and second bracket portions. The mounting bracket can also include at least one spring positioned to bias the at least one pair of telescoping shafts to an extended configuration. The luminaire can have at least one spring member selectively engageable with at least one shaft of the at least one pair of telescoping shafts to selectively interconnect the luminaire and the mounting bracket.

BRIEF DESCRIPTION OF THE DRAWINGS

The detailed description set forth below references the following drawings:

FIG. 4 is an exploded view of a luminaire of the lighting arrangement shown in FIG. 1;

FIG. 10 is a perspective view of the mounting bracket shown in FIG. 5 with a portion cutaway;

FIG. 11 is a perspective view of the mounting bracket shown in FIG. 5 with a portion cutaway;

DETAILED DESCRIPTION

Figure 1:
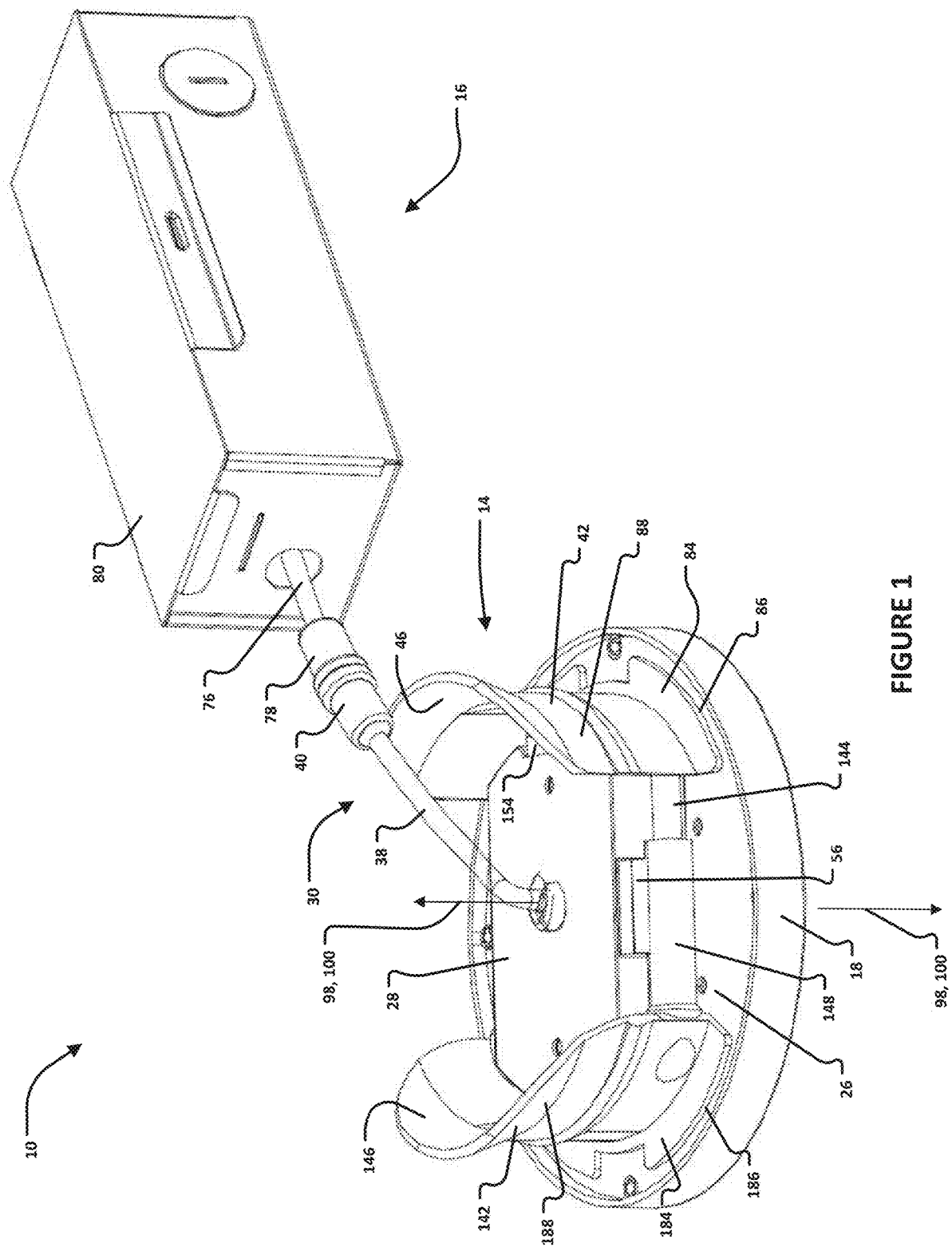
FIG. 1 is a perspective view of a lighting arrangement according to an exemplary embodiment of the present disclosure.

The present disclosure, as demonstrated by the exemplary embodiments described below, can provide lighting arrangements that do not require an installer to make specialized holes into the ceiling or wall mounting location for each shape and size of luminaire. Also, lighting arrangements according to one or more embodiments of the present disclosure can be comprised of components that are attached together without the need for tools.

An exemplary lighting arrangement 10 includes a luminaire 12, a mounting bracket 14, and a driver unit 16. The luminaire 12 can be mounted to a ceiling or wall with the mounting bracket 14. The driver unit 16 can be positioned above the ceiling or in the wall and supply power to the luminaire 12.

The luminaire 12 can include a trim 18, a diffusor 20, a light guide 22, a light engine 24, a back cover 26, an alignment housing 28, and electrical connector 30. The trim 18 can take any desired shape, including square, circular, oval, rectangular, or any other shape. The diffusor 20, the light guide 22, and the light engine 24 can be positioned in the trim 18. The diffusor 20, the light guide 22, and the light engine 24 can be enclosed in a cavity defined by the trim 18 and closed by the back cover 26. The light guide 22 can include a backing paper on an upper surface 32. The light engine 24 can surround the light guide 22. The light engine 24 can include a printed circuited board (PCB) 34 and a plurality of light emitting diodes (LEDs) 36. The alignment housing 28 extends along on a housing longitudinal axis 100. The exemplary housing longitudinal axis 100 and a central longitudinal axis 98 of the mounting bracket 14 are collinear when the luminaire 12 and the mounting bracket 14 are engaged with one another. The electrical connector 30 includes wiring portion 38 and a plug or socket-type terminal 40. The wiring portion 38 passes through the alignment housing 28 and interconnects the terminal 40 and the PCB 34.

Figure 5:
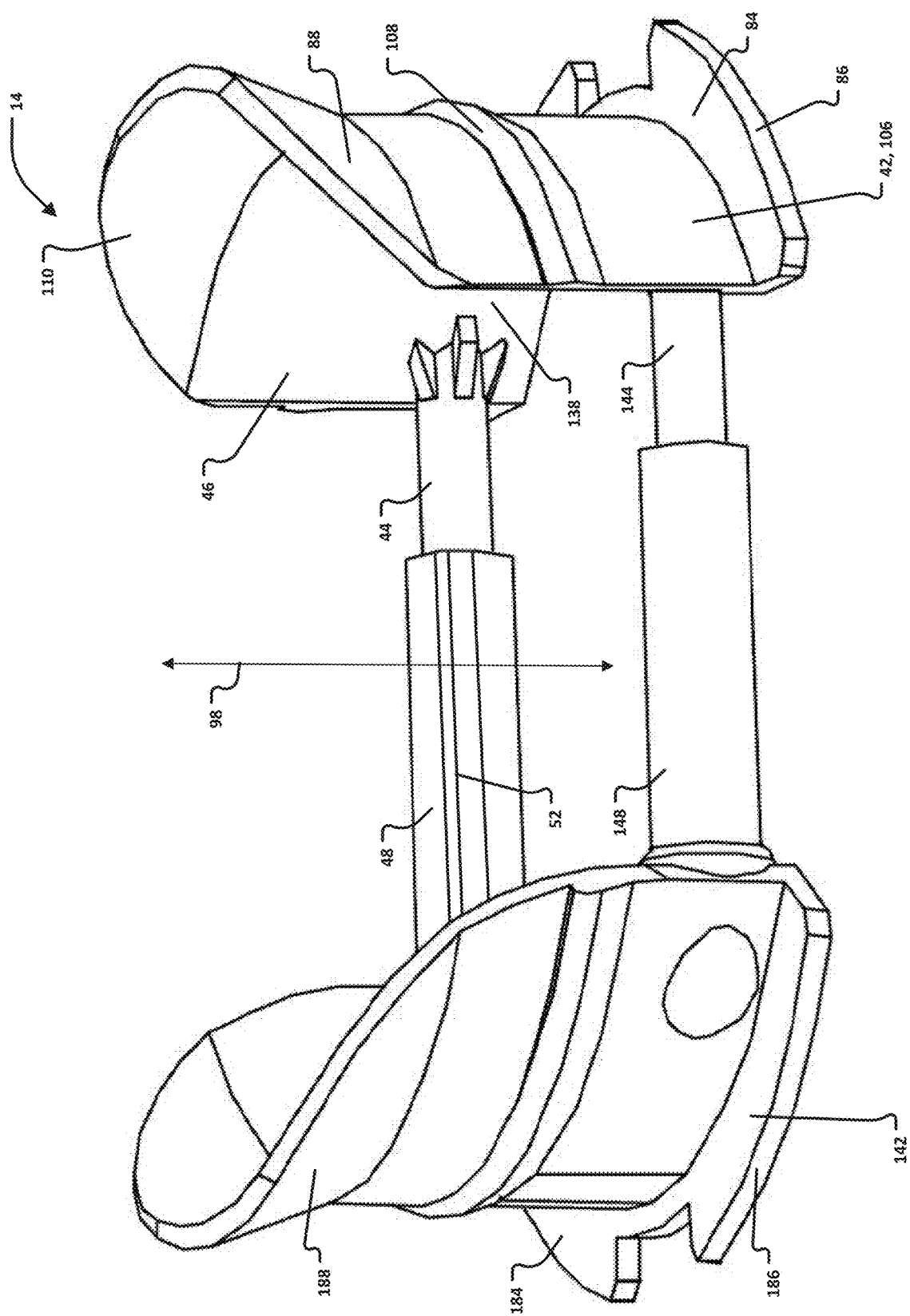
FIG. 5 is a perspective view of a mounting bracket of the lighting arrangement shown in FIG. 1.
Figure 6:
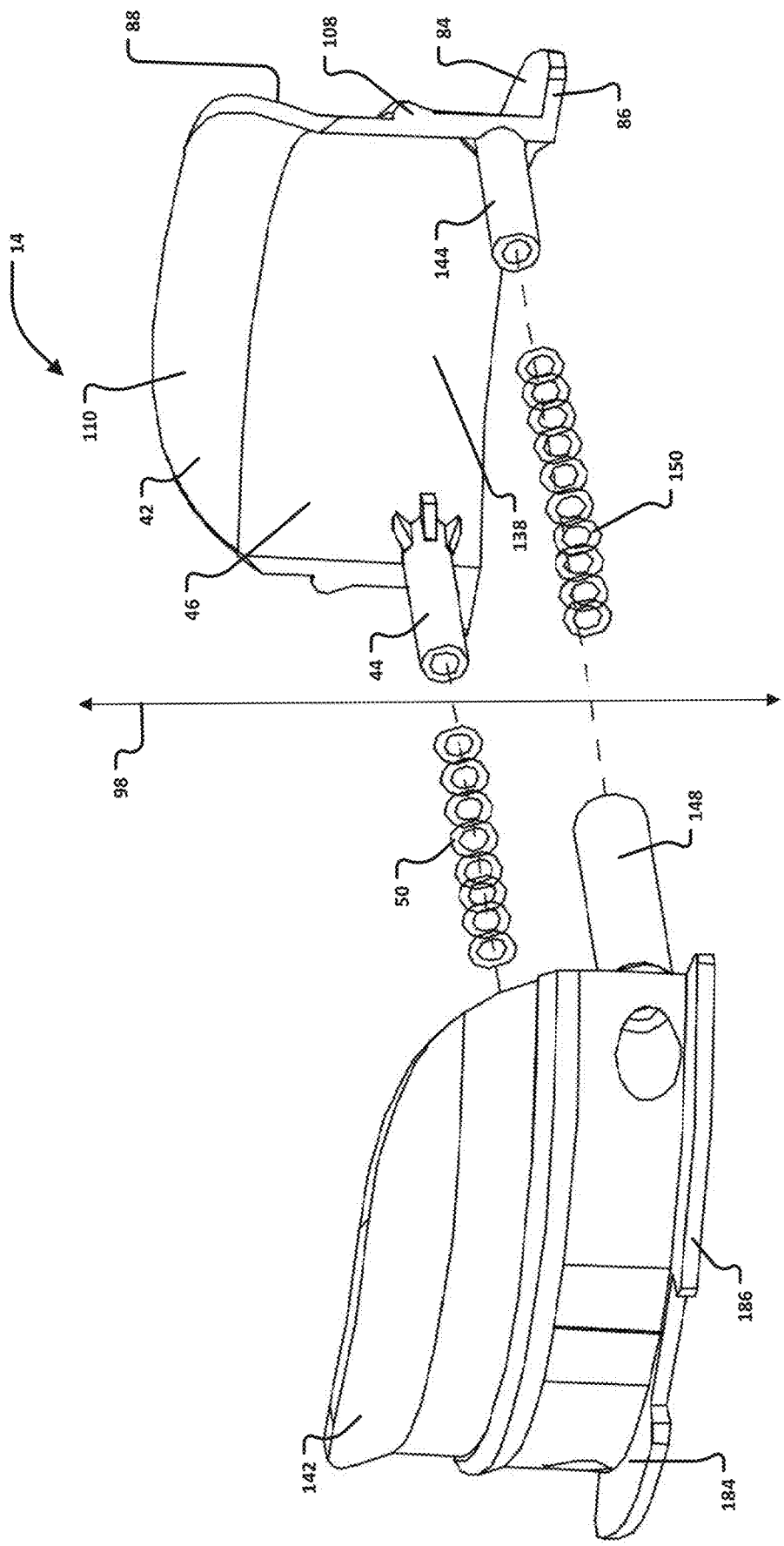
FIG. 6 is an exploded view of the mounting bracket shown in FIG. 5.
Figure 8:
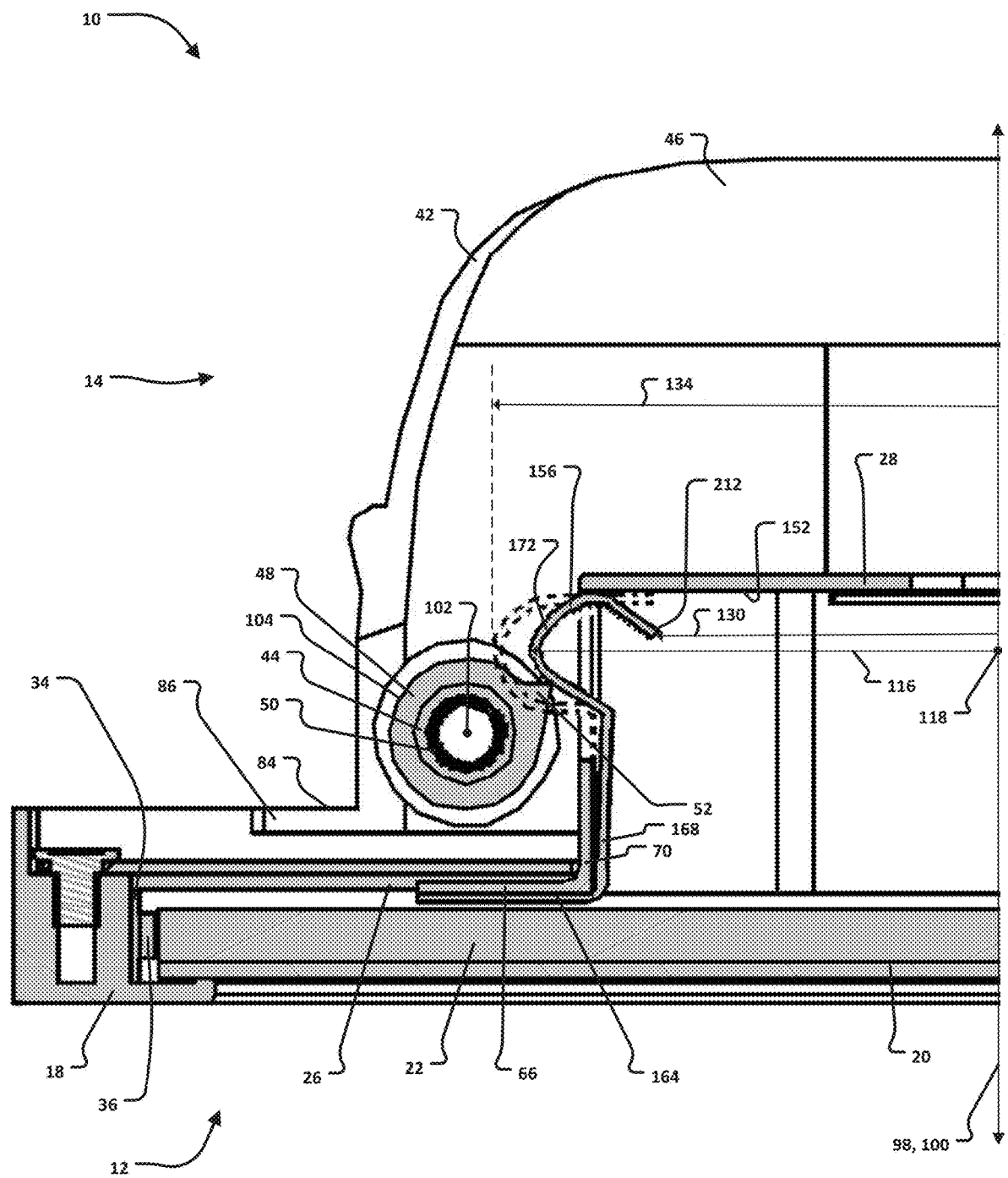
FIG. 8 is a partial cross-section taken through section lines 8-8 in FIG. 2.

The mounting bracket 14 includes first and second saddles or bracket portions 42, 142. The exemplary first and second bracket portions 42, 142 are positioned across the central longitudinal axis 98 from one another. The first bracket portion 42 includes shafts 44, 144 extending from an inward face 46. The second saddle 142 includes shafts 48, 148 extending from an inward face 146. It is noted that the shafts 48 and 148 are mirrored in terms of cross-sectional shape with respect to one another. The shafts 44, 144, 48, 148 are sized such that the shafts 44, 144 are telescopically received in the shafts 48, 148. The shafts 44 and 48 thus define a first pair of telescoping shafts and the shafts 144, 148 define a second pair of telescoping shafts. The mounting bracket 14 also includes springs 50, 150 that can be positioned within the shafts 48, 148 and bias the first and second bracket portions 42, 142 away from each other. The exemplary shafts 48, 148 define a circular inner profile to receive the inner shafts 44, 144 and a non-circular outer profile. As best shown in FIGS. 5, 8 and 11, the outer profile of each post 48, 148 defines a shoulder, such as shoulder 52 of post 48, that projects toward the other post 48, 148. FIG. 8 shows a cross-section taken through a plane perpendicular to a central longitudinal axis 102 of the outer shaft 48. The cross-sectional profile of the shaft 48 in this plane includes an arcuate edge 104 centered on the central longitudinal axis 102 and also includes the shoulder 52 projecting away from opposite ends of the arcuate edge 104. The post 148 includes a similar shoulder, but mirrored relative to the shoulder 52. The purpose of the shoulders is set forth below.

Each of the exemplary first and second bracket portions 42, 142 include an engaging surface portion facing away from the central longitudinal axis 98 and configured to engage an aperture defined in one of the wall and the ceiling. The exemplary engaging surface portion of the first bracket portion 42 is at least partially cylindrical and is referenced at 106. The exemplary engaging surface portion 106 is arcuate in profile when viewed in a plane normal to the axis 98 and is centered on the central longitudinal axis 98. Each of the exemplary first and second bracket portions 42, 142 include a flange 86, 186 projecting radially outward at a bottom edge of the respective engaging surface portion. The exemplary flanges 86, 186 also extend about the central longitudinal axis 98. Each of the exemplary first and second bracket portions 42, 142 include a protuberance projecting radially outward at a top edge of the respective engaging surface portion and also extending about the central longitudinal axis 98. The exemplary protuberance of the first bracket portion 42 is referenced at 108. The flange 86 and the protuberance 108 are respectively configured to engage an outer edge and an inner edge of the aperture defined in the one of the wall and the ceiling, to inhibit movement of the bracket 14 relative to the wall or ceiling.

Each of the exemplary first and second bracket portions 42, 142 include a frustoconical portion. The exemplary frustoconical portion of the first bracket portion 42 includes a frustoconical outer surface portion 88 facing away from the central longitudinal axis 98 and centered on the central longitudinal axis 98. The flange 86 and the frustoconical outer surface portion 88 are spaced from one another along the central longitudinal axis 98. The exemplary engaging surface portion 106 is positioned between the frustoconical outer surface portion 88 and the flange 86 along the central longitudinal axis 98. The exemplary frustoconical portion of the first bracket portion 42 also includes a frustoconical inner surface portion 110 facing toward the central longitudinal axis 98 and centered on the central longitudinal axis 98. The frustoconical portion of the mounting bracket 14 can be useful in guiding wiring between the luminaire 12 and the driver unit 16.

The luminaire 12 can also include a pair of spring members 56, 156. The exemplary spring members 56, 156 are identically-shaped. The exemplary spring member 156 includes a first flat portion 164 mountable inside of the alignment housing 28, against a lower flange 66 of the alignment housing 28. The first flat portion 164 and the lower flange 66 can be interconnected with one or more fasteners, such as screws. The exemplary longitudinal spring member 56 also includes a planar vertical portion 68 that follows and inside of a wall 70 of the alignment box 28. The exemplary longitudinal spring member 56 also includes a bowed portion or bend 72 extending from the vertical portion 68 radially outward from the housing longitudinal axis 100. The bend 72 extends outside of the alignment housing 28 through an aperture 74 in the alignment housing 28. The exemplary bend 72 defines at least part of the exemplary spring member 56 that is biased toward the central longitudinal axis 98 by one of the exemplary shafts 48, 148 when the luminaire 12 is engaged with the mounting bracket 14. The exemplary flat portion 64 thus defines a first base end of the spring member 56 connected to the alignment housing 28. The exemplary spring member 56 extends from the first base end 64 to a first distal end 112 cantilevered off of the alignment housing 28. The exemplary bowed portion 72 defines at least one bend positioned between the first base end 64 and the first distal end 112.

As set forth above, the exemplary spring members 56, 156 are identically-shaped. The exemplary flat portion 164 thus defines a first base end of the spring member 156 connected to the alignment housing 28. The exemplary spring member 156 extends from the first base end 164 to a first distal end 212 cantilevered off of the alignment housing 28. The exemplary spring member 156 includes a bowed portion 172 that defines at least one bend positioned between the first base end 164 and the first distal end 212. The exemplary bend 172 projects a maximum distance away from the central longitudinal axis 98 at a first position along the central longitudinal axis 98 when the mounting bracket 14 and the luminaire 12 are engaged with one another. This maximum distance is shown in FIG. 8 which is a cross-section taken in plane containing the axis 98. The maximum distance is referenced at 116 and the first position is referenced at 118. The exemplary maximum distance 116 is defined when the spring member 156 is elastically deformed by engagement with the shaft 48, in particular with the shoulder 52 of the shaft 48.

Figure 2:
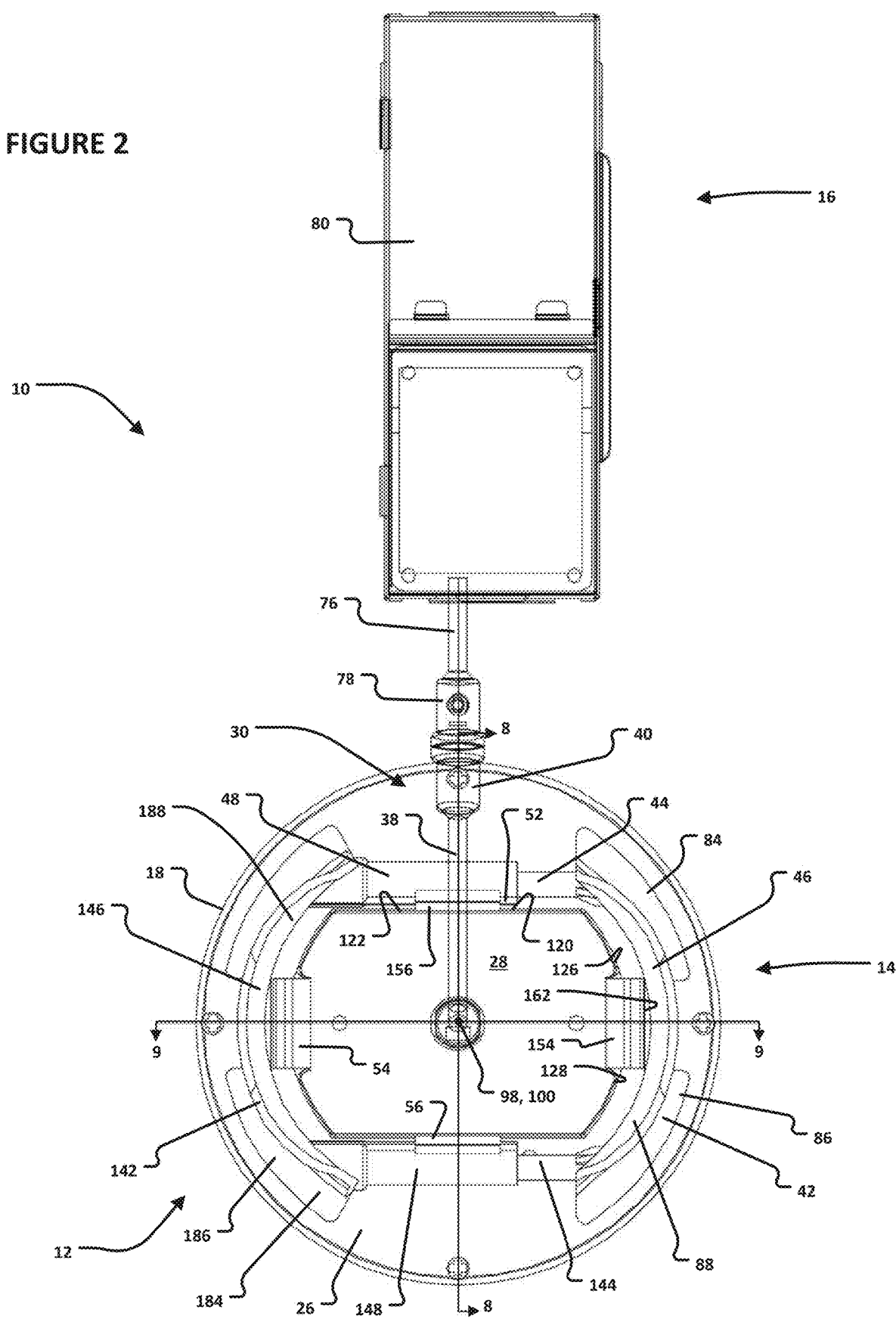
FIG. 2 is a top view of the lighting arrangement shown in FIG. 1.
Figure 7:
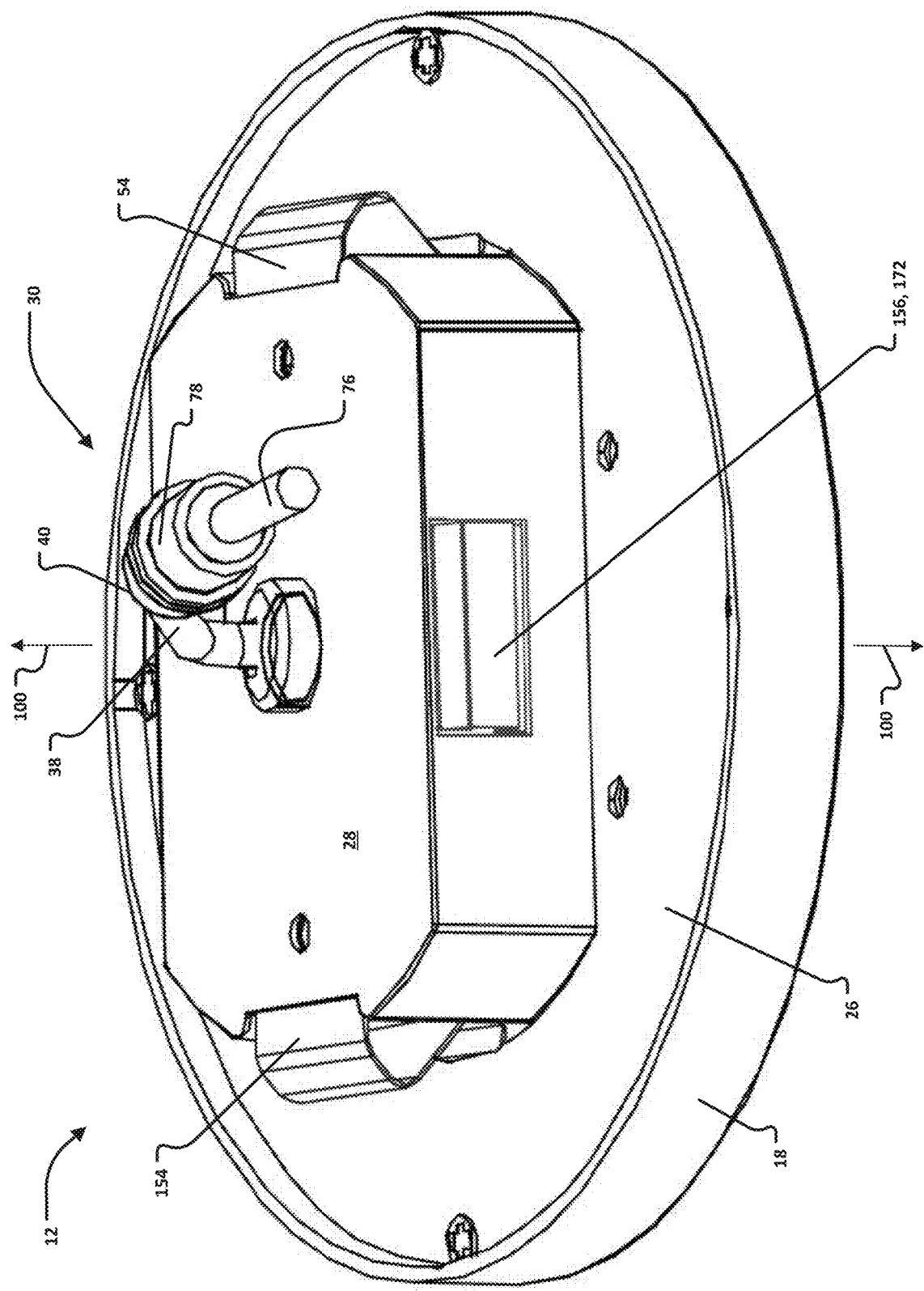
FIG. 7 is a perspective view of the luminaire shown in FIG. 4.

Referring again to FIGS. 2 and 7, the alignment housing 28 defines first and second surface portions 120, 122 positioned at the first position 118 along the central longitudinal axis 98 when the mounting bracket 14 and the luminaire 12 are engaged with one another. The first and second surface portions 120, 122 are immediately adjacent to and on opposite sides of the at least one bend 172 about the housing longitudinal axis 100. The at least one bend 172 projects further away from the central longitudinal axis 98 than the first and second surface portions 120, 122 of the alignment housing 28 when the mounting bracket 14 and the luminaire 12 are engaged with one another, as shown in FIG. 2. As shown in FIG. 8, the bend 172 is biased toward the central longitudinal axis 98 by the shoulder 52 of the outer shaft 48 when the mounting bracket 14 and the luminaire 12 are engaged with one another. The spring member 156, when not biased, is shown in phantom in FIG. 8.

The luminaire 12 can also include a pair of spring elements 54, 154. The exemplary spring elements 54, 154 are selectively engageable with respective portions of the first and second bracket portions 42, 142. The portions are parts of the inward faces 46, 146 of the first and second bracket portions 42, 142 that are spaced from and inbetween the shafts 44, 48, 144, 148. The exemplary spring elements 54, 154 are identically-shaped. The exemplary spring element 54 includes a flat portion or base end 58 mountable inside of the alignment housing 28, against an upper planar portion 60 of the alignment housing 28. The flat portion 58 and the upper planar portion 60 can be interconnected with a fastener such as a screw. The exemplary spring element 58 extends from the base end 58 to a distal end 124 cantilevered off of the alignment housing 28. The exemplary spring element 54 also includes a bend 62 between the base end 58 and the distal end 124. The bend 62 extends outside of the alignment housing 28 through an aperture 63 in the alignment housing 28. The bend 62 defines at least part of the exemplary spring element 54 that is biased toward the central longitudinal axis 98 by one of the first and second bracket portions 42, 142 when the luminaire 12 is engaged with the mounting bracket 14.

Figure 9:
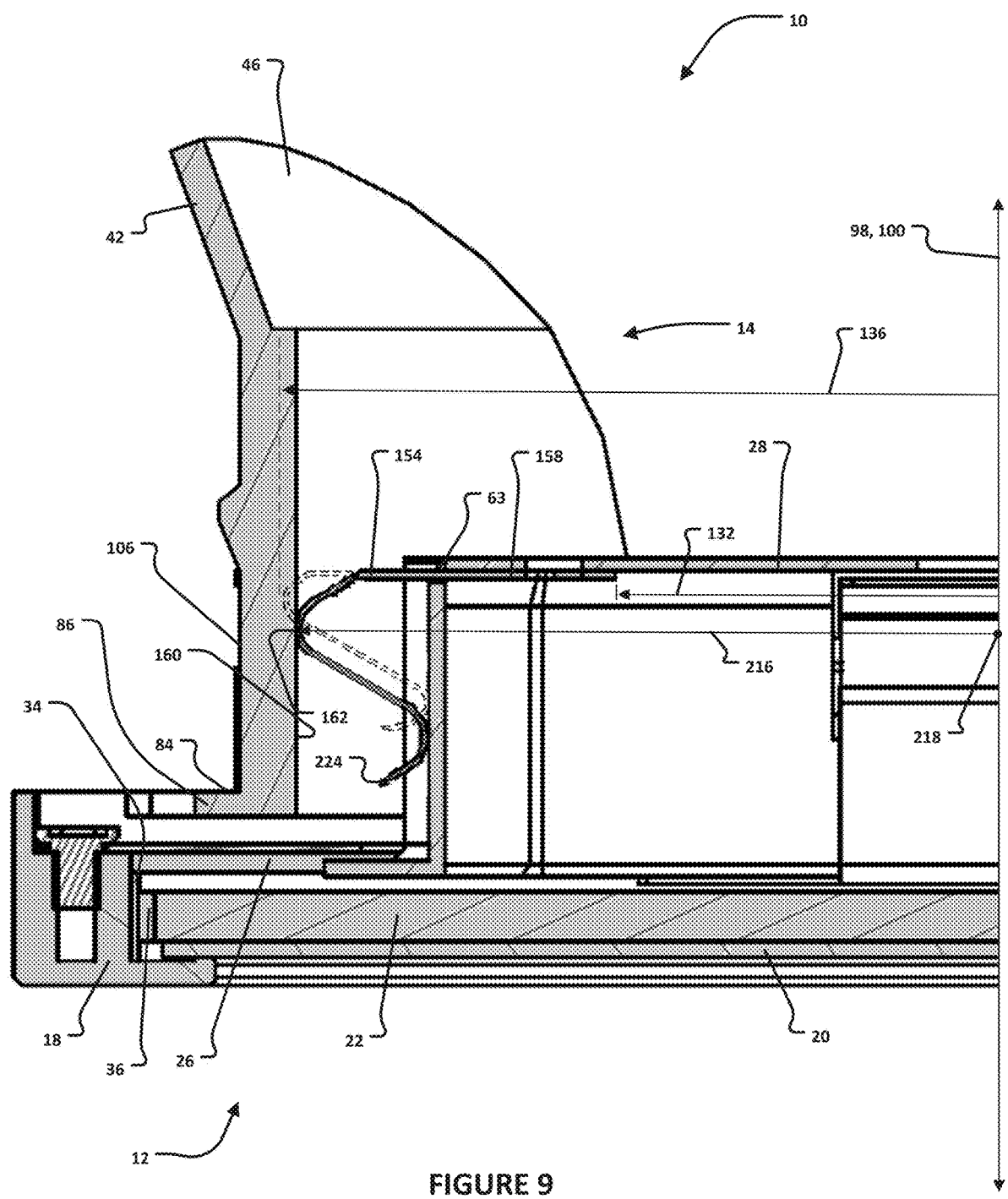
FIG. 9 is a partial cross-section taken through section lines 9-9 in FIG. 2.

As set forth above, the exemplary spring elements 54, 154 are identically-shaped. The spring element 154 includes a base end 158, a bend 162, and a distal end 224. As shown in FIG. 9, the exemplary bend 162 projects a maximum distance away from the central longitudinal axis 98 at a second position along the central longitudinal axis 98 when the mounting bracket 14 and the luminaire 12 are engaged with one another. This maximum distance is shown in FIG. 9 which is a cross-section taken in plane containing the axis 98. The maximum distance is referenced at 216 and the second position is referenced at 218. It is noted that the first position 118 and the second position 218 may or may not be the same.

Referring now to FIG. 2, the alignment housing 28 defines third and fourth surface portions 126, 128 positioned at the second position 218 along the central longitudinal axis 98 when the mounting bracket 14 and the luminaire 12 are engaged with one another. The third and fourth surface portions 126, 128 are immediately adjacent to and on opposite sides of the exemplary bend 162 of the exemplary spring element 154 about the central longitudinal axis 98 when the mounting bracket 14 and the luminaire 12 are engaged with one another. The exemplary bend 162 projects further away from the central longitudinal axis 98 than the third and fourth surface portions 126, 128 of the alignment housing 28 when the mounting bracket 14 and the luminaire 12 are engaged with one another. The exemplary bend 162 is biased toward the central longitudinal axis 98 by the first bracket portion 42 when the mounting bracket 14 and the luminaire 12 are engaged with one another in the exemplary figures. It is noted that the luminaire 12 can be engaged with the mounting bracket 14 in a position rotated one hundred and eighty degrees about the axis 98 from the position shown in the exemplary figures.

The first spring element 54 is biased toward the central longitudinal axis 98 by a surface portion 138 defined by the first bracket portion 42 when the luminaire 12 is engaged with the mounting bracket 14. The surface portion 138 is part of the inward face 46. The surface portion 138 faces toward the central longitudinal axis 98 and extends about the central longitudinal axis 98 between the shaft 44 and the shaft 144. The second spring element 154 is biased toward the central longitudinal axis 98 by a surface portion 140 defined by the second bracket portion 142 when the luminaire 12 is engaged with the mounting bracket 14. The surface portion 140 is part of the inward face 146. The surface portion 140 faces toward the central longitudinal axis 98 and extends about the central longitudinal axis 98 between the shaft 48 and the shaft 148.

The exemplary spring member 156 and the exemplary spring element 154 are spaced ninety degrees from one another about the central longitudinal axis 98 when the mounting bracket 14 and the luminaire 12 are engaged with one another. A minimum distance (referenced at 130 in FIG. 8) between the exemplary spring member 156 and the central longitudinal axis 98 when the mounting bracket 14 and the luminaire 12 are engaged with one another is less than a minimum distance (referenced at 132 in FIG. 9) between the exemplary spring element 154 and the central longitudinal axis 98 when the mounting bracket 14 and the luminaire 12 are engaged with one another.

The exemplary spring member 156 projects away from the alignment housing 28 a first maximum distance in direction perpendicular to the housing longitudinal axis 100 when the mounting bracket 14 and the luminaire 12 are disengaged from one another. The first maximum distance is referenced at 134 in FIG. 8. The spring member 156, when the mounting bracket 14 and the luminaire 12 are disengaged from one another, is shown in phantom in FIG. 8. The exemplary spring element 154 projects away from the alignment housing 28 a second maximum distance in direction perpendicular to the housing longitudinal axis 100 when the mounting bracket 14 and the luminaire 12 are disengaged from one another. The second maximum distance is referenced at 136 in FIG. 9. The spring element 154, when the mounting bracket 14 and the luminaire 12 are disengaged from one another, is shown in phantom in FIG. 9. The second maximum distance is greater than the first maximum distance. As the drawings also show, the exemplary spring element 154 projects further away from the immediately-adjacent outer surface portions 126, 128 of the alignment housing 28 than the exemplary spring member 156 projects further away from the immediately-adjacent outer surface portions 120, 122. This allows the spring elements 54, 154 to accommodate a wider range of distances between the bracket portions 42, 142 and thus accommodate a wider range of hole sizes in the wall/ceiling.

In the exemplary embodiment, the bend 172 is a portion of the spring member 156 that slides along a surface portion 152 defined by the alignment housing 28 as the luminaire 12 is brought into engagement with the mounting bracket 14. The exemplary surface portion 152 is transverse to the housing longitudinal axis 100. In the exemplary embodiment, the bend 162 is a portion of the spring element 154 slides along a surface portion 160 defined by the alignment housing 28 as the luminaire 12 is brought into engagement with the mounting bracket 14. The surface portion 160 parallel to the housing longitudinal axis 100.

Figure 3:
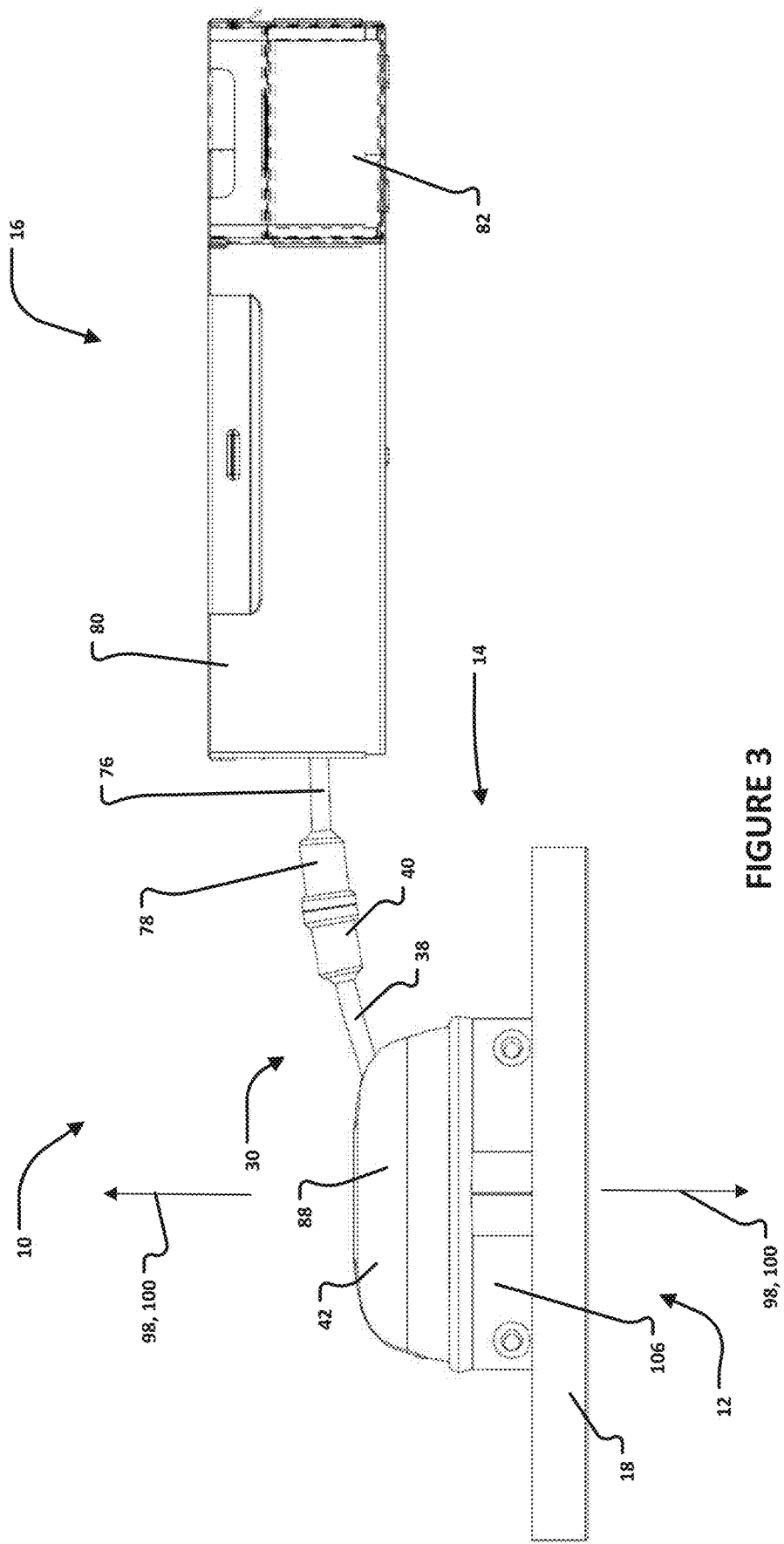
FIG. 3 is a side view of the lighting arrangement shown in FIG. 1.

The exemplary driver unit 16 includes wiring portion 76, a plug or socket-type terminal 78, and a housing 80. Wiring from the electrical system of a building can be directed to the driver unit 16 to supply the driver unit 16 with power off of the grid. Power from the grid is supplied to circuitry (not shown) positioned in the housing 80 of the driver unit 16 and this circuitry converts the electrical current/power as desired. The wiring portion 76 is electrically connected to the internal circuitry to receive electrical current/power for the light engine 24. The wiring portion 76 passes out of the housing 80 and extends to the terminal 40. The terminals 40, 78 are configured to selectively connect and disconnect as desired. The exemplary driver unit 16 also includes a magnet housed in the housing 80, referenced in phantom at 82 in FIG. 3. The magnet 82 allows the driver unit 16 to be positioned against a metal plate or other metal structure in the ceiling.

In an exemplary operation to install the lighting arrangement 10, a hole can be formed in the ceiling, such as with a three and one-half inch hole saw. Wiring from the building can then be interconnected with the internal circuitry of the driver unit 16. The driver unit 16 can then be moved through the hole and above the ceiling, with the magnet 82 against any appropriate metallic structure in the ceiling. The bracket portions 42, 142 can then be pressed together, compressing the springs 50, 150. The bracket portions 42, 142 can then be placed in the hole and released. The bracket portions 42, 142, once released, will press radially outwardly against the hole. Outwardly-facing engaging surface portions (such as 106) of the bracket portions 42, 142 press against the surface defining the hole. Also, top surfaces 84, 184 of flanges 86, 186 of the bracket portions 42, 142 can be flush against the ceiling or wall. The wall or ceiling can be captured between the flanges 86, 186 and the protuberances (such as 108).

Next, the terminals 40 and 78 can be interconnected. Then the luminaire 12 can be raised, with the alignment housing 28 positioned between the telescopically-engaged posts 44/48 and 144/148. The bends of the spring elements 54, 154 are elastically compressed against the surface portions 138, 140 and press outward against the inward faces 46, 146. The spring elements 54, 154 thus cooperate to center the alignment housing 28 between the bracket portions 42, 142. This pressing force also inhibits downward movement of the luminaire.

As the spring elements 54, 154 engage the inward faces 46, 146, the spring members 56, 156 engage the shafts 48, 148. The spring members 56, 156 are elastically deformed by the shafts 48, 148. Referring now to FIG. 8, the vertical portion 168 and the bowed portion 172 can be bent around the flat portion 164. The shape of the spring member 156 before deformation is shown in phantom in FIG. 8. The cooperation between the shoulder 52 and the bowed portion 172 results in the recovery force generated by the spring member 156 inducing upward movement of the luminaire 12. The luminaire 12 is thus engaged with the bracket 14 and ready for use.

Figure 12:
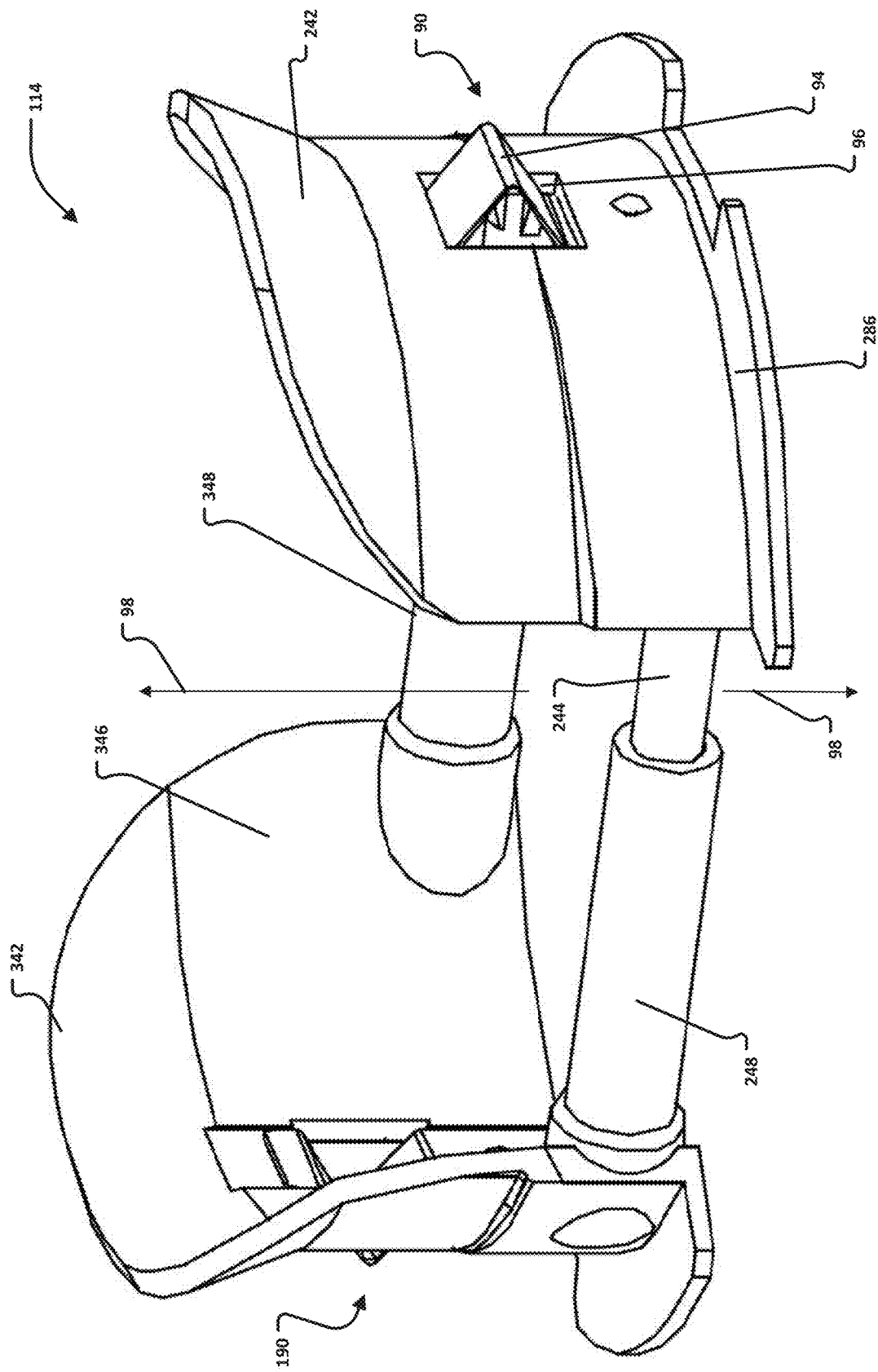
FIG. 12 is a perspective view of a mounting bracket according to another embodiment of the present disclosure.
Figure 13:
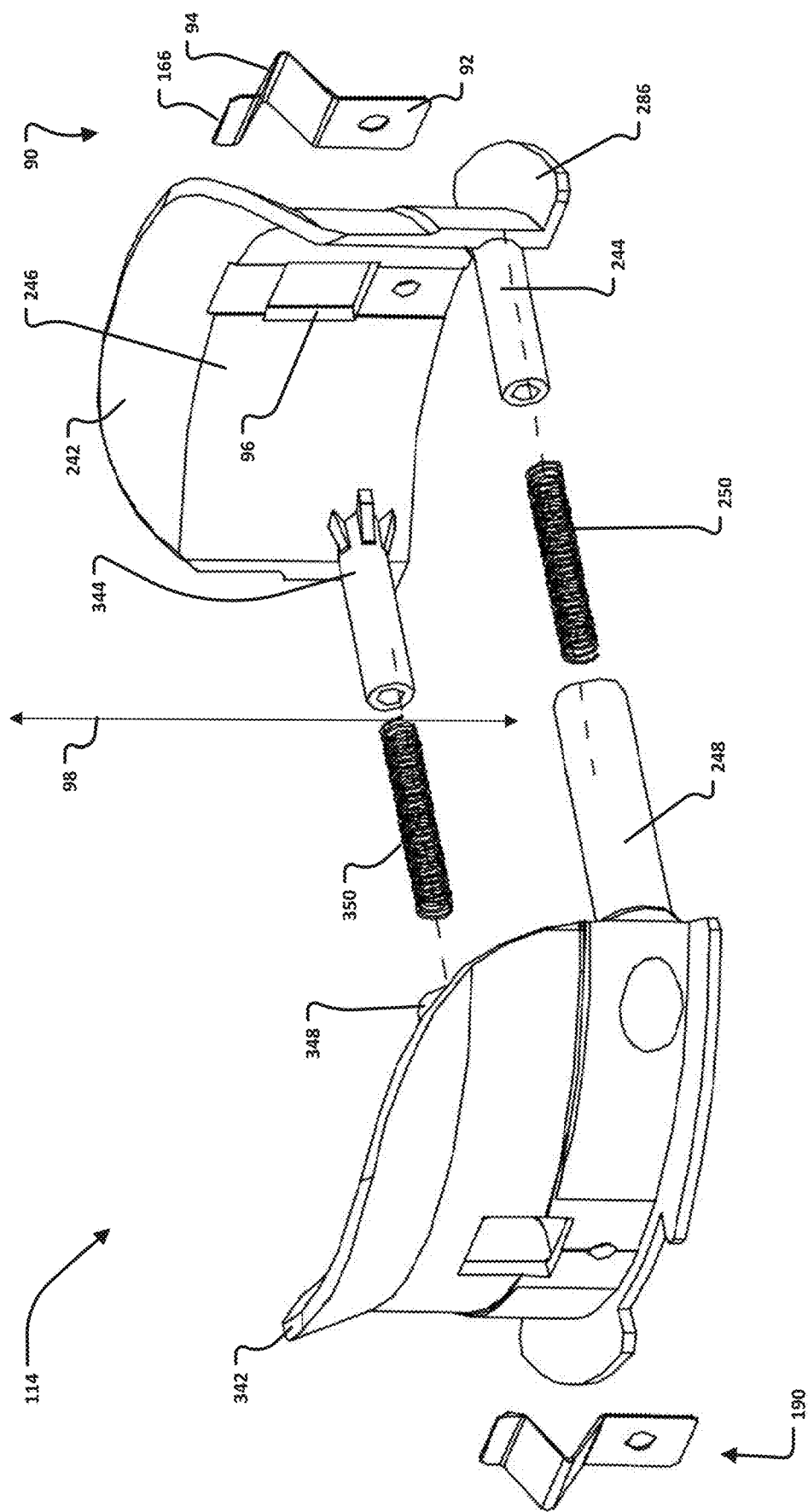
FIG. 13 is an exploded view of the mounting bracket shown in FIG. 12.
Figure 14:
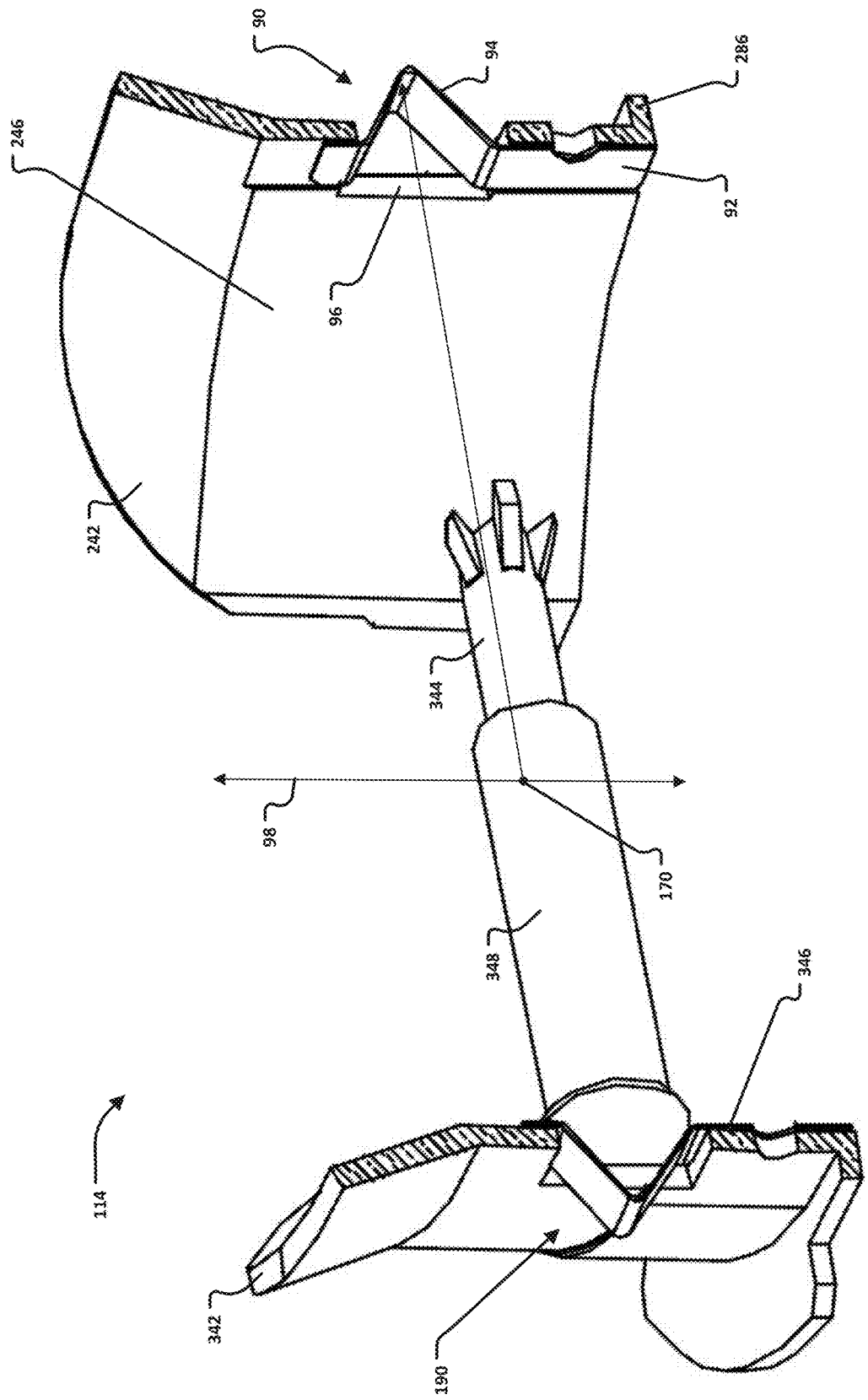
FIG. 14 is a perspective view of the mounting bracket shown in FIG. 12 with a portion cutaway.

FIGS. 12-14 disclose an alternative mounting bracket 114. The mounting bracket 114 includes first and second saddles 242, 342. The first saddle 242 includes shafts 244, 344 extending from an inward face 246. The second saddle 342 includes shafts 248, 348 extending from an inward face 346. The shafts 244, 344, 248, 348 are sized such that the shafts 244, 344 are telescopically received in the shafts 248, 348. The mounting bracket 114 also includes springs 250, 350 that can be positioned within the shafts 248, 348 and bias the first and second saddles 242, 342 away from each other. The exemplary shafts 248, 348 define a circular inner profile to receive the shafts 244, 344 and a non-circular outer profile.

The exemplary alternative mounting bracket 114 also includes spring arms 90, 190. The exemplary spring arms 90, 190 are identically-shaped. Each of the exemplary spring arms 90, 190 is mountable on one of the first and second bracket portions 42, 142. The exemplary spring 90 includes a flat portion or base end 92 mountable to the inward face 246. The exemplary spring 90 extends between the base end 92 and a distal end 166 cantilevered off of the bracket portion 242. The flat portion 92 and the saddle 246 can be interconnected with a fastener such as a screw. The exemplary spring 90 also includes a bend 94 extending from the flat portion 92 and extending through an aperture 96 in the saddle 246. The exemplary bend 94 projects a maximum distance away from the central longitudinal axis 98 of the mounting bracket 114 at a first position 170 along the central longitudinal axis 98. The exemplary bend 94 projects further away from the central longitudinal axis 98 than the first and second bracket portions 242, 342 at the first position 170 along the central longitudinal axis 98. As shown in FIGS. 12-14, the outermost surfaces of the first and second bracket portions 242, 342 that are at the first position about the axis 98 are recessed toward the axis 98 relative to the bend 94. The bend 94 can cooperate with the flange 286 to releasably capture the wall or ceiling. When the bracket 114 is installed, the bend 94 can "pinch" the wall or ceiling against the flange 286.

Embodiments of the present disclosure can be practiced in various ways. FIGS. 1-12 define one embodiment in which four springs are utilized on the luminaire 12. An embodiment could also be practiced in which only spring members 56 and 156 are utilized. Another embodiment could also be practiced in which two springs on the luminaire 12 and two springs on the bracket (such as bracket 114) are utilized.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A lighting arrangement comprising:
    a mounting bracket having first and second bracket portions positioned about a central longitudinal axis of said mounting bracket, said mounting bracket also including at least one pair of telescoping shafts interconnecting said first and second bracket portions, said mounting bracket also including at least one spring positioned to bias said at least one pair of telescoping shafts to an extended configuration; and
    a luminaire having at least one spring member selectively engageable with at least one shaft of said at least one pair of telescoping shafts to selectively interconnect said luminaire and said mounting bracket.

2. The lighting arrangement of claim 1 further comprising:
    at least one spring arm mountable on one of said first and second bracket portions, wherein said at least one spring arm extends from a second base end connected to said one of said first and second bracket portions to a second distal end cantilevered off of said one of said first and second bracket portions, wherein said at least one spring arm defines at least one bend positioned between said second base end and said second distal end, wherein said at least one bend projects a maximum distance away from said central longitudinal axis of said mounting bracket at a first position along said central longitudinal axis of said mounting bracket, wherein said at least one bend projects further away from said central longitudinal axis than said first and second bracket portions at said first position along said central longitudinal axis.

3. The lighting arrangement of claim 2 wherein said one of said first and second bracket portions further comprises an aperture and wherein said at least one bend projects through said aperture.

4. The lighting arrangement of claim 1 wherein at least one of said first and second bracket portions further comprises:
an engaging surface portion facing away from said central longitudinal axis of said mounting bracket and configured to engage an aperture defined in one of a wall and a ceiling.

5. The lighting arrangement of claim 4 wherein said engaging surface portion is further defined as arcuate in profile and centered on said central longitudinal axis.

6. The lighting arrangement of claim 4 wherein at least one of said first and second bracket portions further comprises:
a flange projecting radially outward from said at least one of said first and second bracket portions at a bottom edge of said engaging surface portion and also extending about said central longitudinal axis; and
a protuberance projecting radially outward from said at least one of said first and second bracket portions at a top edge of said engaging surface portion and also extending about said central longitudinal axis, said flange and said protuberance respectively configured to engage an outer edge and an inner edge of the aperture defined in the one of the wall and the ceiling.

7. The lighting arrangement of claim 1 wherein at least one of said first and second bracket portions further comprises:
a frustoconical outer surface portion facing away from said central longitudinal axis of said mounting bracket and centered on said central longitudinal axis of said mounting bracket; and
a frustoconical inner surface portion facing toward said central longitudinal axis of said mounting bracket and centered on said central longitudinal axis of said mounting bracket.

8. The lighting arrangement of claim 7 wherein at least one of said first and second bracket portions further comprises:
a flange projecting radially outward from said at least one of said first and second bracket portions and also extending about said central longitudinal axis, said flange and said frustoconical outer surface portion spaced from one another along said central longitudinal axis.

9. The lighting arrangement of claim 8 wherein at least one of said first and second bracket portions further comprises:
an at least partially cylindrical engaging surface portion facing away from said central longitudinal axis of said mounting bracket and centered on said central longitudinal axis, said at least partially cylindrical engaging surface portion positioned between said frustoconical outer surface portion and said flange along said central longitudinal axis.

10. The lighting arrangement of claim 1 wherein said at least one pair of telescoping shafts further comprises:
an inner shaft projecting from one of said first and second bracket portions; and
an outer shaft projecting from the other of said first and second bracket portions, said inner shaft received in said outer shaft, a cross-section taken through a plane perpendicular to a central longitudinal axis of said outer shaft including an arcuate edge centered on said central longitudinal axis of said outer shaft and also including a shoulder projecting away from opposite ends of said arcuate edge.

11. The lighting arrangement of claim 10 wherein said luminaire further comprises:
an alignment housing extending along on a housing longitudinal axis, wherein said housing longitudinal axis and said central longitudinal axis of said mounting bracket are collinear when said luminaire and said mounting bracket are engaged with one another; and
wherein said at least one spring member is further defined as extending from a first base end connected to said alignment housing to a first distal end cantilevered off of said alignment housing, wherein said at least one spring member defines at least one bend positioned between said first base end and said first distal end, wherein said at least one bend projects a maximum distance away from said central longitudinal axis of said mounting bracket at a first position along said central longitudinal axis of said mounting bracket when said mounting bracket and said luminaire are engaged with one another, wherein said alignment housing defines first and second surface portions positioned at said first position along said central longitudinal axis of said mounting bracket when said mounting bracket and said luminaire are engaged with one another, wherein said first and second surface portions are immediately adjacent to and on opposite sides of said at least one bend about said central longitudinal axis of said mounting bracket when said mounting bracket and said luminaire are engaged with one another, wherein said at least one bend projects further away from said central longitudinal axis of said mounting bracket than said first and second surface portions of said alignment housing when said mounting bracket and said luminaire are engaged with one another, said at least one bend biased toward said central longitudinal axis of said mounting bracket by said shoulder of said outer shaft when said mounting bracket and said luminaire are engaged with one another.

12. The lighting arrangement of claim 11 further comprising:
at least one spring element extending from a third base end connected to said alignment housing to a third distal end cantilevered off of said alignment housing, wherein said at least one spring element defines at least one bend positioned between said third base end and said third distal end, wherein said at least one bend of said at least one spring element projects a maximum distance away from said central longitudinal axis of said mounting bracket at a second position along said central longitudinal axis of said mounting bracket when said mounting bracket and said luminaire are engaged with one another, wherein said alignment housing defines third and fourth surface portions positioned at said second position along said central longitudinal axis of said mounting bracket when said mounting bracket and said luminaire are engaged with one another, wherein said third and fourth surface portions are immediately adjacent to and on opposite sides of said at least one bend of said at least one spring element about said central longitudinal axis of said mounting bracket when said mounting bracket and said luminaire are engaged with one another, wherein said at least one bend of said at least one spring element projects further away from said central longitudinal axis of said mounting bracket than said third and fourth surface portions of said alignment housing when said mounting bracket and said luminaire are engaged with one another, said at least one bend of said at least one spring element biased toward said central longitudinal axis of said mounting bracket by one of said first and second bracket portions when said mounting bracket and said luminaire are engaged with one another.

13. The lighting arrangement of claim 12 wherein said at least one spring member and said at least one spring element are spaced from one another at least ninety degrees about said central longitudinal axis of said mounting bracket when said mounting bracket and said luminaire are engaged with one another.

14. The lighting arrangement of claim 12 wherein a minimum distance between said at least one spring member and said central longitudinal axis of said mounting bracket when said mounting bracket and said luminaire are engaged with one another is less than a minimum distance between said at least one spring element and said central longitudinal axis of said mounting bracket when said mounting bracket and said luminaire are engaged with one another.

15. The lighting arrangement of claim 1 wherein said luminaire further comprises:
   an alignment housing extending along on a housing longitudinal axis, wherein said housing longitudinal axis and said central longitudinal axis of said mounting bracket are collinear when said luminaire and said mounting bracket are engaged with one another; and
   wherein said at least one spring member is further defined as extending from a first base end connected to said alignment housing to a first distal end cantilevered off of said alignment housing, at least part of said at least one spring member biased toward said central longitudinal axis of said mounting bracket by said at least one shaft of said at least one pair of telescoping shafts when said luminaire is engaged with said mounting bracket.

16. The lighting arrangement of claim 15 further comprising:
   at least one spring element extending from a third base end connected to said alignment housing to a third distal end cantilevered off of said alignment housing, at least part of said at least one spring element biased toward said central longitudinal axis of said mounting bracket by at least one of said first and second bracket portions when said luminaire is engaged with said mounting bracket.

17. The lighting arrangement of claim 16 wherein:
   said at least one spring member projects away from said alignment housing a first maximum distance in direction perpendicular to said housing longitudinal axis when said mounting bracket and said luminaire are disengaged from one another; and
   said at least one spring element projects away from said alignment housing a second maximum distance in direction perpendicular to said housing longitudinal axis when said mounting bracket and said luminaire are disengaged from one another, wherein said second maximum distance is greater than said first maximum distance.

18. The lighting arrangement of claim 17:
   wherein said at least one pair of telescoping shafts is further defined as a first pair of telescoping shafts and a second pair of telescoping shafts, said first pair of telescoping shafts including a first shaft extending from said first bracket portion and a second shaft extending from said second bracket portion, said second pair of telescoping shafts including a third shaft extending from said first bracket portion and a fourth shaft extending from said second bracket portion, one of said first shaft and said third shaft received in the other of said first shaft and said third shaft, one of said second shaft and said fourth shaft received in the other of said second shaft and said fourth shaft;
   wherein said at least one spring is further defined as a first spring positioned to bias said first shaft and said third shaft apart and a second spring positioned to bias said second shaft and said fourth shaft apart;
   wherein said at least one spring member is further defined as a first spring member connected to said alignment housing and biased toward said central longitudinal axis of said mounting bracket by one of said first shaft and said third shaft when said luminaire is engaged with said mounting bracket and a second spring member connected to said alignment housing and biased toward said central longitudinal axis of said mounting bracket by one of said second shaft and fourth shaft when said luminaire is engaged with said mounting bracket; and
   wherein said at least one spring element is further defined as a first spring element and a second spring element, said first element connected to said alignment housing and biased toward said central longitudinal axis of said mounting bracket by a fifth surface portion defined by said first bracket portion when said luminaire is engaged with said mounting bracket, said fifth surface portion facing toward said central longitudinal axis of said mounting bracket and extending about said central longitudinal axis between said first shaft and said second shaft, said second spring element connected to said alignment housing and biased toward said central longitudinal axis of said mounting bracket by a sixth surface portion defined by said second bracket portion when said luminaire is engaged with said mounting bracket, said sixth surface portion facing toward said central longitudinal axis of said mounting bracket and extending about said central longitudinal axis between said third shaft and said fourth shaft.

19. The lighting arrangement of claim 18 wherein:
   a portion of said first spring member slides along a seventh surface portion defined by said alignment housing as said luminaire is brought into engagement with said mounting bracket, said seventh surface portion transverse to said housing longitudinal axis; and
   a portion of said first spring element slides along an eighth surface portion defined by said alignment housing as said luminaire is brought into engagement with said mounting bracket, said eighth surface portion parallel to said housing longitudinal axis.

20. The lighting arrangement of claim 1 wherein said luminaire further comprises:
   at least one spring element selectively engageable with a portion of one said first and second bracket portions, said portion of said one said first and second bracket portions spaced from said at least one shaft of said at least one pair of telescoping shafts.

* * * * *